W. D. McLAUCHLIN.
AUTOMOBILE EXTRICATOR.
APPLICATION FILED MAR. 29, 1918.

1,303,698.

Patented May 13, 1919.

Witnesses

Inventor
William D. McLauchlin
By Victor J. Evans
Attorney

UNITED STATES PATENT OFFICE.

WILLIAM D. McLAUCHLIN, OF PORT HURON, MICHIGAN, ASSIGNOR OF ONE-FOURTH TO PETER ZIMMERMAN, ONE-SIXTEENTH TO CHARLES H. SCHMUDE, ONE-SIXTEENTH TO OTTO R. SCHMUDE, ONE-SIXTEENTH TO MAX ROSENTHAL, ONE-EIGHTH TO AVERY B. BURGESS, AND ONE-SIXTEENTH TO THOMAS HESS, ALL OF PORT HURON, MICHIGAN.

AUTOMOBILE-EXTRICATOR.

1,303,698.   Specification of Letters Patent.   Patented May 13, 1919.

Application filed March 29, 1918. Serial No. 225,514.

*To all whom it may concern:*

Be it known that I, WILLIAM D. MC-LAUCHLIN, a citizen of the United States, residing at Port Huron, in the county of St. Clair and State of Michigan, have invented new and useful Improvements in Automobile-Extricators, of which the following is a specification.

This invention contemplates the provision of a device, through the instrumentality of which a motor vehicle or the like can be easily withdrawn out of the mud or a ditch, when its own traction power is incapable of moving the machine in such circumstances.

An object of the invention resides in the provision of a device of this character, comprising a plurality of detachably connected sections, to permit the device with the parts disassembled to occupy a small amount of space in the tool box or other part of the machine, and capable of being easily and quickly anchored in the ground when its use is desired.

The invention embodies among other features a cable drum of novel construction, providing a sinuous passage for the cable, thereby preventing slipping of the latter and assuring a positive operation of the device.

With these and other objects in view which will appear as the following description is read in connection with the accompanying drawing, the invention resides in the construction, combination and arrangement of parts as claimed.

In the drawing forming part of this specification like numerals of reference indicate similar parts in the several views and wherein:—

Figure 1:
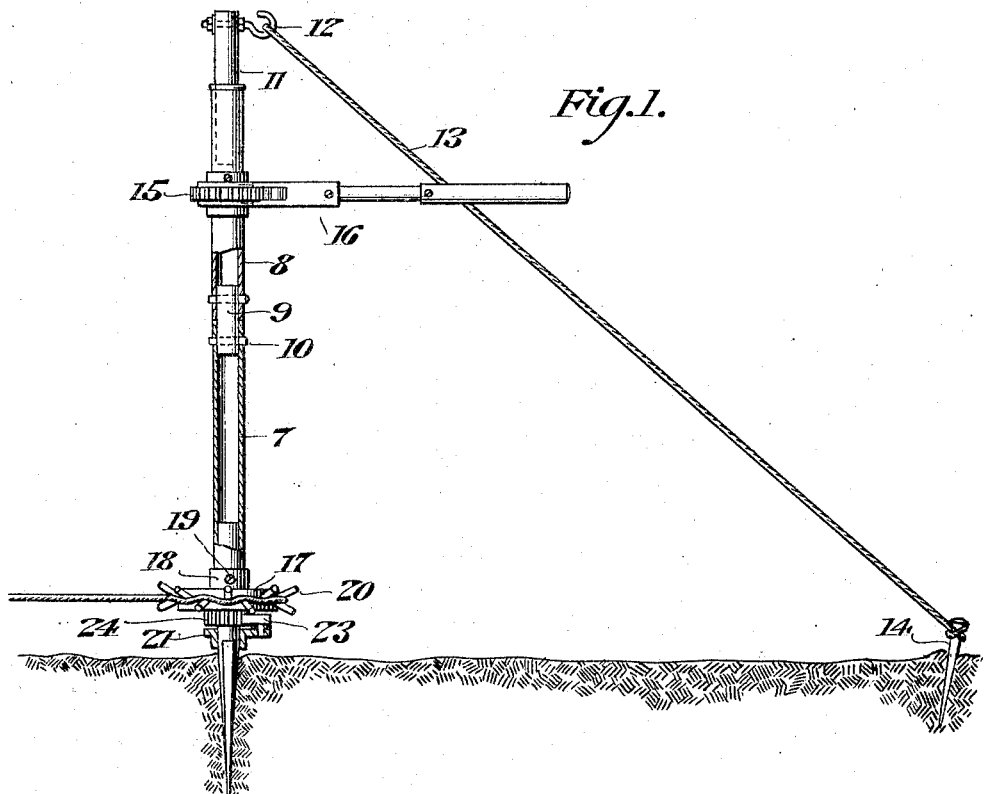
Figure 1 is a view showing the device in position for use and the manner of using the same.
Figure 2:
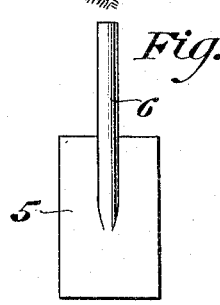
Fig. 2 is a detail view of the anchor.
Figure 3:
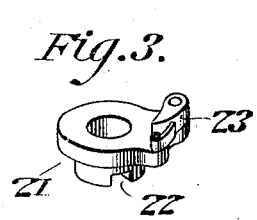
Fig. 3 is a view of the washer and pawl.

Before entering into a detail description of what is herein shown and described, which constitutes the preferred embodiment of my invention, I desire to have it understood that I do not limit myself to this precise construction, and that various changes may be resorted to when desired as fall within the scope of what is claimed.

While it has been hereinabove stated that the device is primarily intended for use in the capacity of a motor vehicle extricator, during which time it is arranged in vertical position, it is desired to have it understood that it is also susceptible for use in other capacities, and capable of being used in horizontal position. However as shown in this particular instance the device consists of a base upon which a shaft is adapted to be mounted for rotation. The base may be of any suitable construction but preferably consists of an anchor plate 5 adapted to be driven into the ground, and rising from said plate and adapted to project above the surface of the ground is a spindle 6. The shaft is preferably hollow and made up of a plurality of detachably connected sections, of any desired dimensions, and as many sections may be employed as found necessary or desirable. As shown the two sections 7 and 8 respectively are connected by means of a coupling 9 provided with suitable openings adapted to aline with openings in the adjacent ends of the respective sections, for the reception of suitable fastening elements such as cotter pins or the like indicated at 10. The section 7 receives and is rotatably mounted upon the spindle 6, while the uppermost section has fitted therein a relatively stationary section 11 about which the shaft as a whole rotates, the stationary section projecting a slight distance above the upper end of the shaft and having associated therewith one or more laterally projecting hooks 12 to which one end of the guy cable 13 is connected, the opposite end of the cable being secured in any suitable manner to a stake 14 adapted to be driven in the ground at a remote point from the anchor plate 5.

Associated with the shaft at a suitable point in its length is a ratchet wheel 15 which is actuated by means of the pawl lever 16 to impart a rotary motion to the shaft as will be readily understood. The lever 16 is made up of a number of detachably connected sections, so that the component parts of this element together with the component parts of the shaft may be readily disassembled, to provide a comparatively small article which will occupy a minimum amount of space within a tool box or about the machine when not in use.

Secured in any suitable manner upon the lower end of the section 7 of the shaft is a cable drum 17, the latter being preferably provided with a collar 18 which snugly embraces the section 7 and is secured thereto by means of the set screws 19. The drum may be of any suitable construction to obtain an effective hold upon the cable, which latter has one terminal secured to the machine A, but as shown in this particular instance the drum has projecting from the periphery thereof a circumferential series of lugs 20 which are disposed in staggered relation, and are alternately inclined in opposite directions to provide a sinuous passage about the circumference of the drum for the reception of the cable thereby eliminating all possibility of the cable slipping, as well as assuring a positive operation of the device.

With a view of preventing retrograde movement of the shaft, as the lever is operated to obtain a new hold upon the ratchet 15 I provide a washer ring 21 having diametrically opposed slots 22 to receive the upper edge of the anchor plate 5, as the ring is placed upon the spindle 6 in the manner clearly illustrated in Fig. 1. Operatively associated with the upper surface of the ring is a pawl 23 which engages a ratchet surface 24 formed on the drum. Obviously as the lever is rotated to obtain a new hold upon the ratchet wheel 15, the pawl 23 coöperates with the ratchet surface 24 to prevent retrograde movement of the shaft or drum.

It will be manifest from the foregoing description that I have provided a device which is very simple in construction as well as very efficient for the purpose intended, and wherein the parts may be quickly assembled and disassembled as the occasion may require.

What is claimed is:—

1. A device of the class described comprising an anchor plate adapted to be driven into the ground and having an upwardly extending spindle, a hollow shaft rotatably mounted upon said spindle, a cable drum secured to said shaft for rotation therewith, means for rotating said shaft, a ratchet surface on the drum, a support mounted on the spindle of the anchor and notched and receiving the upper end of the anchor whereby it is held against rotation, and a pawl mounted on the said support and engaging the ratchet surface of the drum.

2. A device of the class described comprising an anchor plate adapted to be driven into the ground, a spindle rising therefrom and disposed above the surface, a ring immovably positioned upon said spindle, a hollow shaft rotatably mounted upon said spindle and including a plurality of detachably connected sections, a cable drum secured to said shaft for rotation therewith, means for rotating said shaft, a ratchet surface on said drum, and a pawl carried by said ring and associated with said ratchet surface to prevent retrograde movement of the shaft.

3. A device of the class described comprising an anchor plate adapted to be driven into the ground, a spindle rising therefrom and disposed above the surface, a ring fitted upon said spindle and having opposed slots for the reception of the adjacent edge of said plate to hold said ring immovable, a hollow shaft rotatably mounted upon said spindle, a cable drum secured to said shaft for rotation therewith, means for rotating said shaft, a ratchet surface on said drum, and a pawl associated with said ring for engagement with said surface to prevent retrograde movement of the shaft.

In testimony whereof I affix my signature in presence of two witnesses.

WILLIAM D. McLAUCHLIN.

Witnesses:
M. ROSENTHAL,
FRED C. GODLEY.

Copies of this patent may be obtained for five cents each, by addressing the "Commissioner of Patents, Washington, D. C."